United States Patent
Chen et al.

(10) Patent No.: US 9,508,193 B2
(45) Date of Patent: Nov. 29, 2016

(54) APPARATUS, METHOD, AND NON-TRANSITORY TANGIBLE COMPUTER READABLE MEDIUM THEREOF FOR CREATING 3D SCENE

(71) Applicant: HTC CORPORATION, Taoyuan, Taoyuan County (TW)

(72) Inventors: Li-Cheng Chen, Taoyuan (TW); Huai-Che Lee, Taoyuan (TW); Jhih-Rong Chen, Taoyuan (TW); Yung-Chao Tseng, Taoyuan (TW); Hsin-Ti Chueh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 34 days.

(21) Appl. No.: 14/588,996

(22) Filed: Jan. 5, 2015

(65) Prior Publication Data

US 2015/0193974 A1    Jul. 9, 2015

Related U.S. Application Data

(60) Provisional application No. 61/923,287, filed on Jan. 3, 2014.

(51) Int. Cl.
| | | |
|---|---|---|
| *G06T 15/10* | (2011.01) | |
| *G06T 15/20* | (2011.01) | |
| *G06T 17/20* | (2006.01) | |
| *G06T 15/04* | (2011.01) | |

(52) U.S. Cl.
CPC ............... *G06T 17/20* (2013.01); *G06T 15/04* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 2002/0186216 A1* | 12/2002 | Baumberg | G06T 17/10 345/422 |
| 2009/0303233 A1 | 12/2009 | Lin et al. | |
| 2011/0141121 A1* | 6/2011 | Sharp | A63F 13/06 345/505 |
| 2013/0060540 A1* | 3/2013 | Frahm | G06T 15/06 703/2 |

FOREIGN PATENT DOCUMENTS

CN    102047294 A    5/2011

OTHER PUBLICATIONS

Office Action issued in corresponding Taiwan application on Jan. 26, 2016 (and its English translation).

* cited by examiner

*Primary Examiner* — Martin Mushambo
(74) *Attorney, Agent, or Firm* — McClure, Qualey & Rodack, LLP

(57) ABSTRACT

Apparatuses, methods, and non-transitory tangible computer readable media thereof for creating a 3D scene are provided. The apparatus generates a height map according to a plurality of depth data of an image. The apparatus finds a first region of the height map, wherein the depth data within the first region change more greatly than the depth data outside the first region. The apparatus creates a plurality of grids on a plane according to the first region and generate a 3D mesh by morphing the height map with the grids of the plane. The plane and the height map are of the same size, a second region within the plane corresponds to the first region of the height map, and the grids inside the second region has a finer resolution than the grids outside the second region. The apparatus generates the 3D scene by mapping the image onto the 3D mesh.

17 Claims, 5 Drawing Sheets

APPARATUS, METHOD, AND NON-TRANSITORY TANGIBLE COMPUTER READABLE MEDIUM THEREOF FOR CREATING 3D SCENE

This application claims the benefit of U.S. Provisional Application Ser. No. 61/923,287 filed on Jan. 3, 2014, which are hereby incorporated by reference in its entirety.

CROSS-REFERENCES TO RELATED APPLICATIONS

Not applicable.

BACKGROUND OF THE INVENTION

1. Field of the Invention

The present invention relates to apparatuses, methods, and non-transitory tangible computer readable media thereof for creating a 3D scene. More particularly, the present invention relates to apparatuses, methods, and non-transitory tangible computer readable media thereof for creating a 3D scene according to an image and its depth data.

2. Descriptions of the Related Art

Although images showing various kinds of contents are everywhere in our daily lives, people are still not satisfied. The main reason is that these images are two-dimensional (2D) and look flat to human eyes.

Three-dimensional (3D) images/scenes are developed by including depth information into conventional 2D images. Conventionally, a 3D image/scene is generated by the following procedures: capturing a scene from two perspectives and providing the illusion of depth by a special projection device (e.g. 3D eyeglasses). As the conventional procedure for creating 3D images/scenes is cumbersome, a convenient way for creating 3D images/scenes is still in an urgent need.

SUMMARY OF THE INVENTION

The present invention provides an apparatus for creating a three-dimensional (3D) scene. The apparatus comprises a depth analyzer, a mesh generator, and a 3D scene creator, wherein the depth analyzer comprise a height map generator and a detail finder. The height map generator is configured to generate a height map according to a plurality of depth data of an image, wherein the height map and the image have the same aspect ratio. The detail finder is configured to find a first region of the height map, wherein the depth data within the first region change more greatly than the depth data outside the first region. The mesh generator is configured to create a plurality of grids on a plane according to the first region, wherein a size of the plane is equivalent to a size of the height map, a second region within the plane corresponds to the first region of the height map, and the grids inside the second region has a finer resolution than the grids outside the second region. The mesh generator is also configured to generate a 3D mesh by morphing the height map with the grids of the plane. Please note that each of the grids may be formed by two triangles. The 3D space creator is configured to generate the 3D scene by mapping the first image onto the 3D mesh.

The present invention provides a method for creating a 3D scene, which is executed by an electronic apparatus. The method comprises the following steps: (a) generating a height map according to a plurality of depth data of a first image, wherein the height map and the first image have the same aspect ratio, (b) finding a first region of the height map, wherein the depth data within the first region change more greatly than the depth data outside the first region, (c) creating a plurality of grids on a plane according to the first region, wherein a size of the plane is equivalent to a size of the height map, a second region within the plane corresponds to the first region of the height map, and the grids inside the second region has a finer resolution than the grids outside the second region, wherein each of the grids may be formed by two triangles, (d) generating a 3D mesh by morphing the height map with the grids of the plane, and (e) generating the 3D scene by mapping the first image onto the 3D mesh.

The present invention provides a non-transitory tangible computer readable medium which is stored with a computer program. The computer program executes a method for creating a 3D scene after being loaded into an electronic apparatus. The method comprises the following steps of: (a) generating a height map according to a plurality of depth data of a first image, wherein the height map and the first image have the same aspect ratio, (b) finding a first region of the height map, wherein the depth data within the first region change more greatly than the depth data outside the first region, (c) creating a plurality of grids on a plane according to the first region, wherein a size of the plane is equivalent to a size of the height map, a second region within the plane corresponds to the first region of the height map, and the grids inside the second region has a finer resolution than the grids outside the second region, (d) generating a 3D mesh by morphing the height map with the grids of the plane, wherein each of the grids may be formed by two triangles, and (e) generating the 3D scene by mapping the first image onto the 3D mesh.

Generally speaking, the present invention generates a height map according to a plurality of depth data of at least one image, figures out at least one detail region of the height map, generates a 3D mesh according to the at least one detail region and the height map, and generates a 3D scene according to the 3D mesh and the at least one image.

In the present invention, at least one detail region of the height map has to be figured out in order to generate a 3D mesh having multiple resolutions. Each of the at least one detail region is a region that contains more details, a region that contains numerous edges, a region whose distance values change more severe than elsewhere, and/or the like. In the present invention, a 3D mesh is not created evenly and has multiple resolutions. That is, some portions of the 3D mesh are of smaller-size triangles in order to render more details of the 3D scene. Particularly, these portions correspond to the at least one detail region of the height map.

In the present invention, a 3D scene is generated according to the 3D mesh and the at least one image. To be more specific, the 3D scene is generated by mapping at least one image onto the 3D mesh. If there is more than one image and the images are captured from different perspectives/viewpoints/angles, the 3D scene can be generated more vividly. For example, when a 3D scene that looks like seeing from a certain viewpoint has to be generated, suitable images are chosen for mapping to the 3D mesh.

With the above mechanism, the apparatuses, methods, and non-transitory tangible computer readable media of the present invention is able to generate a pleasant 3D scene in a more convenient fashion.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1C illustrates a plurality of grids on the plane 18a;

DESCRIPTION OF THE PREFERRED EMBODIMENT

Figure 1A:
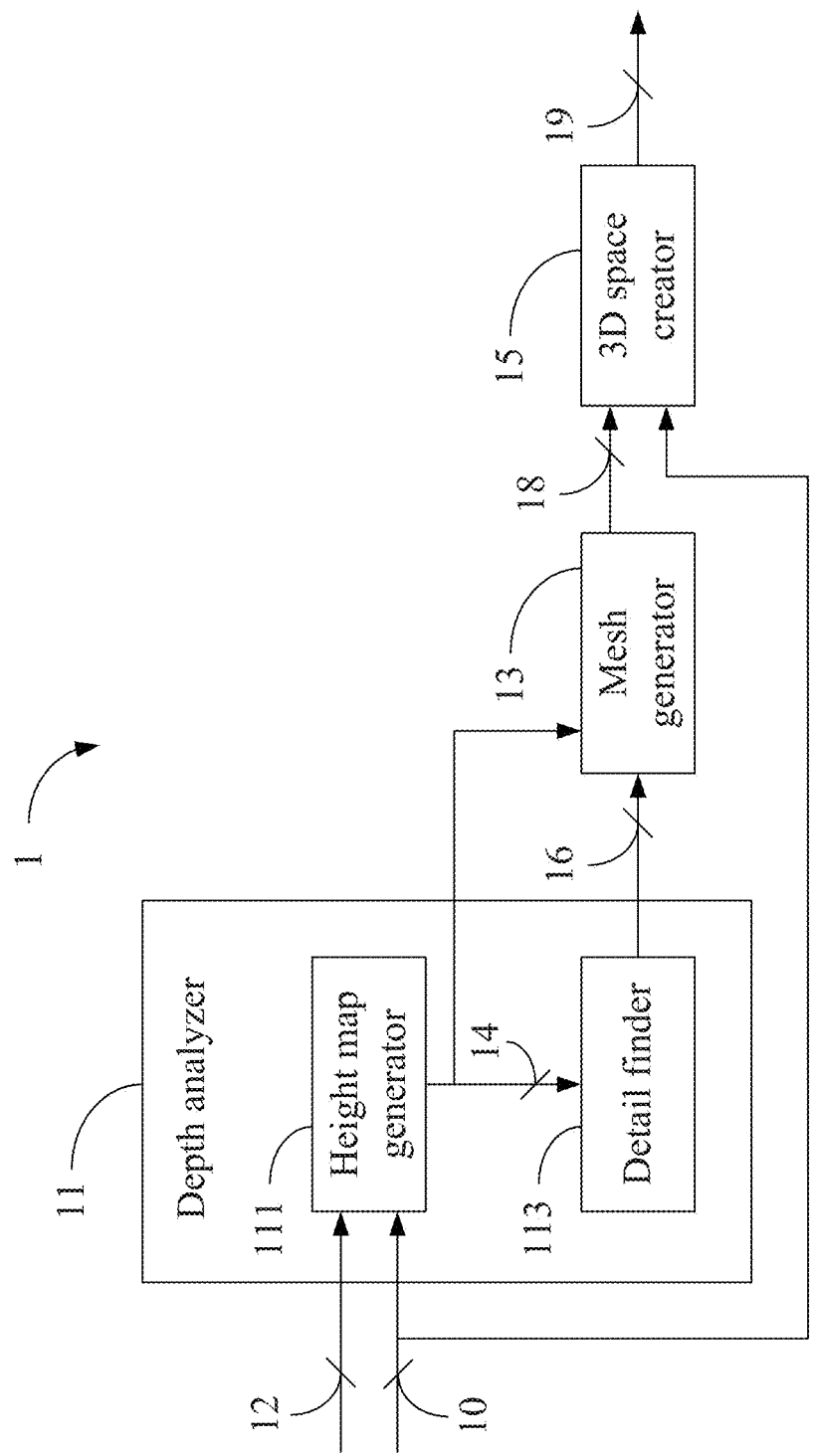
FIG. 1A illustrates a schematic view of an apparatus 1 of the first embodiment.

In the following description, the present invention will be explained with reference to embodiments thereof. However, these embodiments are not intended to limit the present invention to any specific environment, applications, or particular implementations described in these embodiments. Therefore, descriptions of these embodiments is only for purpose of illustration rather than to limit the present invention. It should be appreciated that elements unrelated to the present invention are omitted from depiction in the following embodiments and the attached drawings.

A first embodiment of the present invention is an apparatus 1 for creating a three-dimensional (3D) scene and a schematic view of which is illustrated in FIG. 1. The apparatus 1 comprises a depth analyzer 11, a mesh generator 13, and a 3D space creator 15, wherein the depth analyzer 11 comprises a height map generator 111 and a detail finder 113. The detail finder 113 is electrically connected to the height map generator 111, the mesh generator 13 is electrically connected to the height map generator 111 and the detail finder 113, and the 3D space creator 15 is electrically connected to the mesh generator 13.

In some embodiments, each of the depth analyzer 11, the height map generator 111, the detail finder 113, the mesh generator 13, and the 3D space creator 15 may be realized by an individual processing unit or the like. Yet in some embodiments, the depth analyzer 11, the height map generator 111, the detail finder 113, the mesh generator 13, and the 3D space creator 15 may be integrated as an individual processing unit or the like.

In this embodiment, an image 10 and a plurality of depth data 12 related to the image 10 are inputted to the depth analyzer 11 of the apparatus 1. In some embodiments, the apparatus 1 may have an additional interface for receiving the image 10 and the depth data 12, which are then inputted to the depth analyzer 11. In some embodiments, the apparatus 1 may have a storage being stored with the image 10 and the depth data 12. The image 10 contains a scene of the real world from a viewpoint (or a perspective, an angle, etc.), while each of the depth data 12 comprises a distance value related to a distance between the viewpoint and a point on a surface of the scene of the real world. The depth data 12 may be derived in various ways, such as dual cameras, calculation of a stereo image system, and a distance measuring equipment (e.g. laser measurement equipment, infrared ray measurement equipment, etc.).

The height map generator 111 generates a height map 14 according to the depth data 12. It is noted that the aspect ratio of the height map 14 is equivalent to the aspect ratio of the image 10. The height map generator 111 may generate the height map 14 in various alternative ways. For example, the height map generator 111 may generate the height map 14 by simply inserting the distance values of the depth data 12 into the height map 14. That is, each pixel of the height map 14 corresponds to a distance value. Yet as another example, the height map generator 111 may firstly insert the distance values of the depth data 12 into the height map 14 and then perform a de-noise operation and/or a smooth operation on the distance values contained in the height map 14. When a de-noise operation is performed, the noise caused during the measurement of the distance values can be reduced. When a smooth operation is performed, the unpleasant sharpness of the height map 14 can be reduced.

The detail finder 113 finds a region 16 of the height map 14. The region 16 is a detail region, which means that the depth data within the region 16 change more greatly than the depth data outside the region 16. In other words, the region 16 is a region that contains more details, a region that contains numerous edges, a region whose distance values change more greatly than elsewhere, and/or the like. It also means that a corresponding region of the image 10 has more details than the rest region of the image 10.

The region 16 may be derived in various alternative ways. In some embodiments, the detail finder 113 may generate a gradient map (not shown) of the height map 14 and decide the region of the height map 14 that contains greater gradient values (e.g. greater than a threshold) as the region 16. Yet in some embodiments, the detail finder 113 may refer to a region of interest (ROI) of the height map 14 when deciding the region 16. To be more specific, the detail finder 113 may generate a gradient map of the height map 14 and decide the region within the ROI that contains greater gradient values as the region 16.

Regarding the operations performed by the detail finder 113, several remarks should be given. First, the detail finder 113 may normalize the height map 14 before generating the gradient map so that the calculation in a later stage may be more convenient. Second, the gradient map is adopted by the detail finder 113 in some embodiments due to the characteristic that the greater the gradient values, the more details contained in the corresponding region. Hence, other mechanisms that can distinguish regions having more details from regions having less details may be adopted by the detail finder 113 in the procedure of deciding the region 16 as well.

Figure 1C:
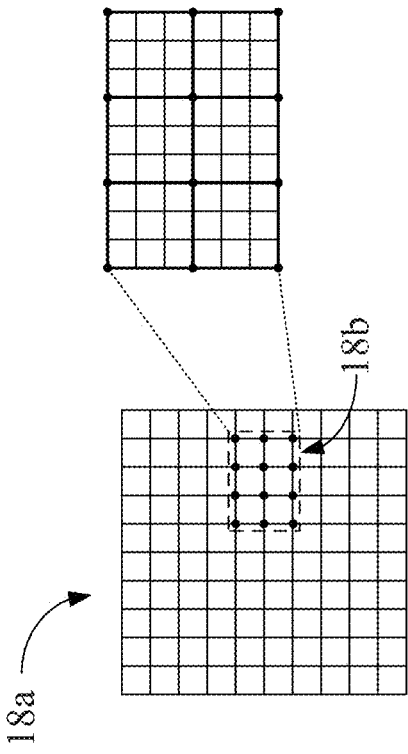
Figure 1E:
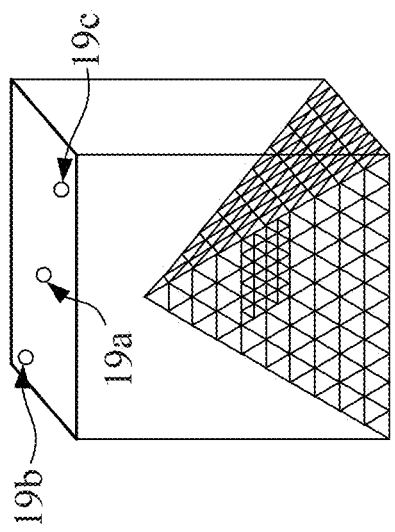
FIG. 1E illustrates the concept of viewing the 3D scene 19 from various viewpoints 19a, 19a, 19c.
Figure 1B:
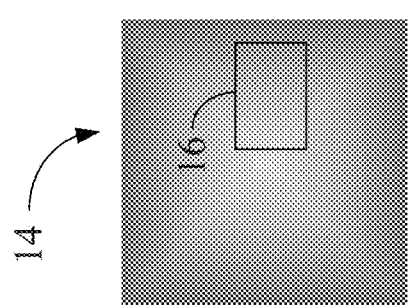
FIG. 1B illustrates an example of the height map 14 and the detail region 16.
Figure 1D:
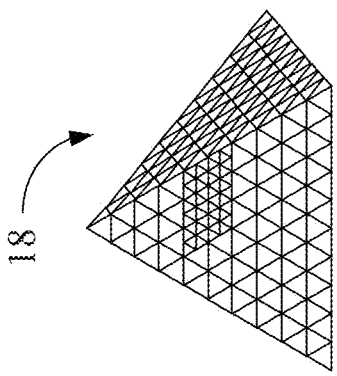
FIG. 1D illustrates the 3D mesh 18 generated by the mesh generator 13.

After the region 16 has been decided, the mesh generator 13 creates a plurality of grids on a plane 18a according to the region 16. It is noted that a size of the plane 18a is equivalent to a size of the height map 14 and every cross point of the grids is treated as a vertex. Please refer to an example shown in FIGS. 1B and 1C. FIG. 1B illustrates an example of the height map 14 and the region 16, wherein the brighter colors indicate the depth data having smaller distance values. As shown in FIG. 1C, a region 18b within the plane 18a corresponds to the region 16 of the height map 14 in terms of the size and the position. The mesh generator 13 creates the grids on the plane 18a according to the region 16 in a way that the grids inside the region 18b has a finer resolution than that of the grids outside the region 18b as shown in FIG. 1C. In some embodiments, the mesh generator 13 may firstly create the grids having the same size on the plane 18a and then subdivides the grids in the region 18b. Since the grids inside the region 18b have a finer resolution, more vertices can be derived. After the grids of the plane 18a have been created, the mesh generator 13 may further divide each of the grids into two triangles. Following that, the mesh generator 13 generates a 3D mesh 18 by morphing the height map 14 with the grids of the plane 18*a* as shown in FIG. 1D.

After the 3D mesh 18 has been generated, the 3D space creator 15 generates a 3D scene 19 by mapping the image 10 onto the 3D mesh 18. The 3D scene 19 appears to the user as looking at the 3D scene from the viewpoint 19*a* as shown in FIG. 1E. Since the 3D scene 19 is three-dimensional, the user will have different viewing experiences when seeing the 3D scene 19 from different viewpoints (e.g. viewpoints 19*b*, 19*c*).

According to the above descriptions, the apparatus 1 can create a 3D scene in an efficient approach because only the image 10 and its corresponding depth data 12 are referred to during the procedure of creating the 3D scene. In the meantime, a 3D scene created by the apparatus 1 is a pleasant one because the detail portion(s) of the image 10 is treated differently by mapping onto a finer portion of the 3D mesh.

Figure 2A:
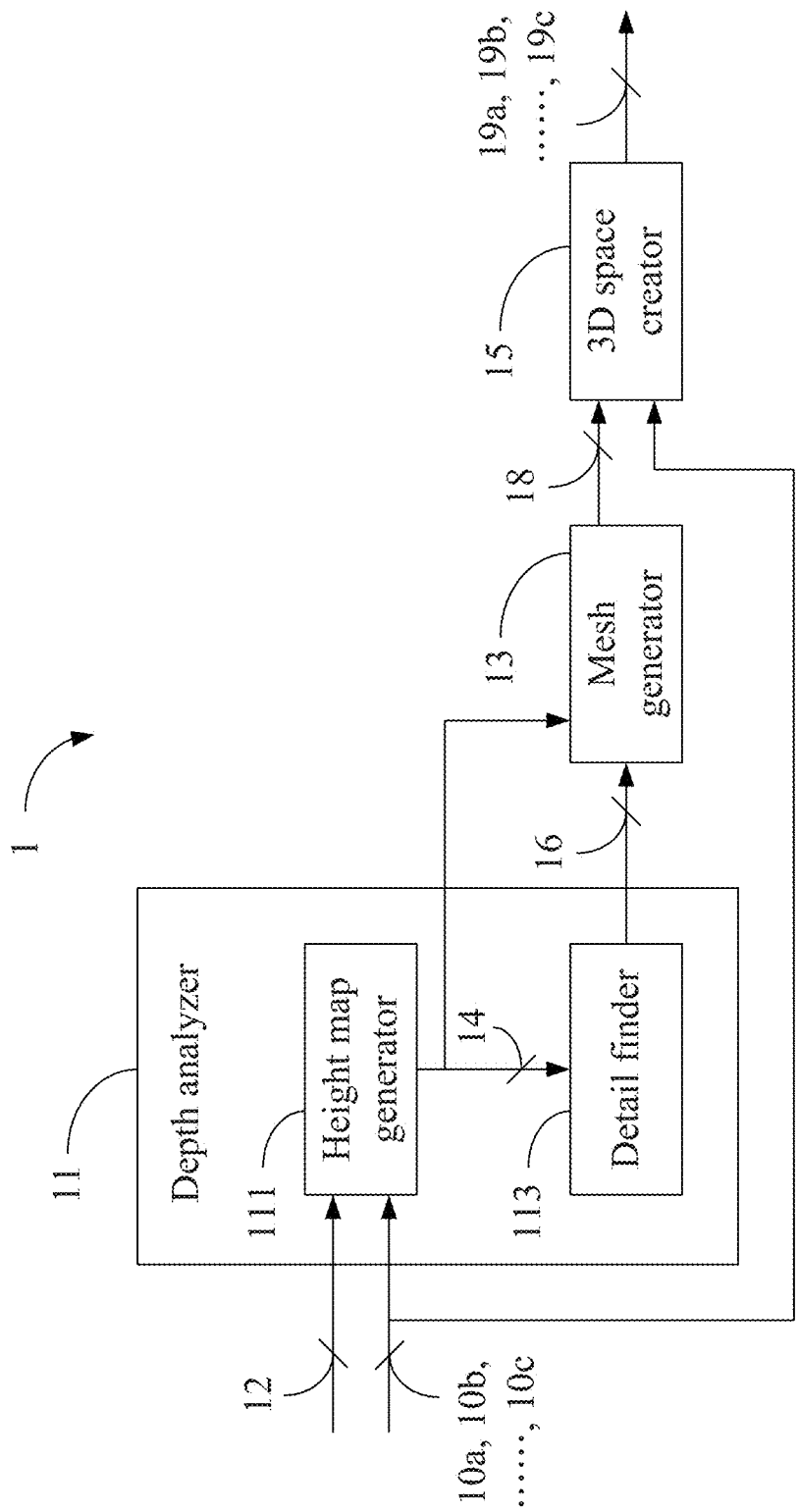
FIG. 2A illustrates the apparatus 1 in the second embodiment of the present invention.
Figure 2B:
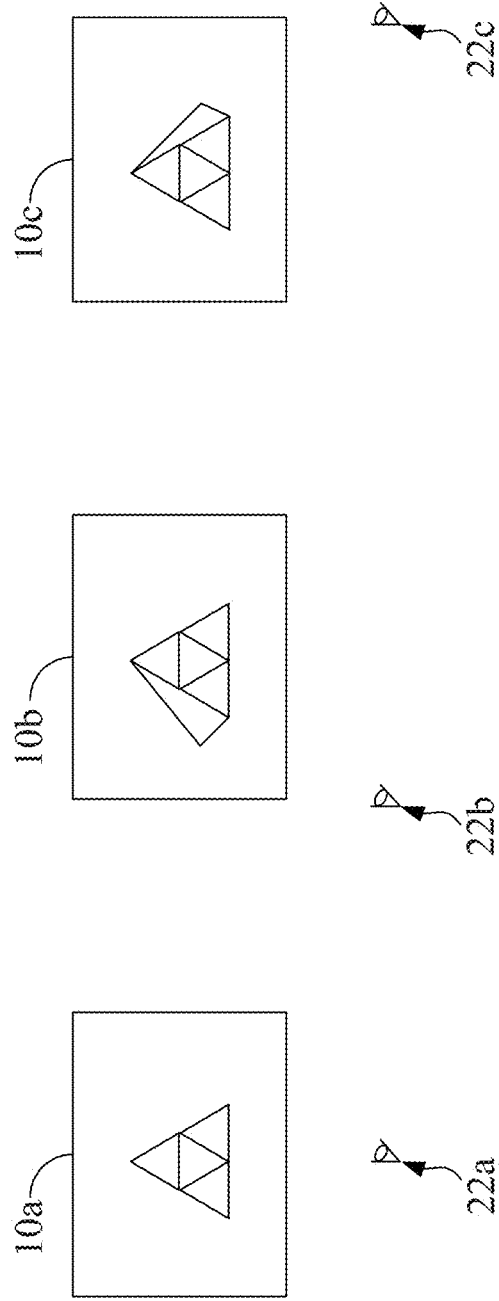
FIG. 2B illustrates the concept of the images 10a, 10b . . . 10c and the viewpoints 20a, 20b, . . . 20c for capturing them.

Please refer to FIG. 2A for the apparatus 1 in a second embodiment of the present invention. In this embodiment, several images 10*a*, 10*b* . . . 10*c* as well as the depth data 12 are inputted to the apparatus 1. The images 10*a*, 10*b*, . . . , 10*c* contain a scene of the real world from different viewpoints 22*a*, 22*b*, . . . , 22*c* as shown in FIG. 2B. Each of the depth data 12 comprises a distance value related to a distance between a viewpoint (e.g. the viewpoint 22*a*) and a point on a surface of the scene of the real world.

In this embodiment, the depth analyzer 11, the height map generator 111, the detail finder 113, and the mesh generator 13 perform similar operations and have similar functions as those described in the first embodiment. Hence, the details are not repeated herein.

In this embodiment, the 3D space creator 15 performs slightly differently. The 3D space creator 15 may generate a 3D scene corresponding to a predetermined viewpoint. For example, when the predetermined viewpoint is the viewpoint 22*a*, the 3D space creator 15 generates the 3D scene by mapping the image 10*a* (i.e. the image corresponding to the viewpoint 22*a*) onto the 3D mesh 18 so that the 3D scene 19*a* is shown.

Later on, the 3D space creator 15 determines that a 3D scene that looks like viewing at the viewpoint 22*c* is required. It happens when the user tilts the apparatus 1 to the left, which may be detected by a G-sensor or the like (not shown) of the apparatus 1. Under this circumstance, the 3D space creator 15 may render the 3D scene 19*b* by mapping the image 10*c* onto the 3D mesh 18. Alternatively, the 3D space creator 15 may also render the 3D scene 19*b* by mapping the images 10*a*, 10*c* onto the 3D mesh 18 according to a ratio in every different apparatus level.

Likewise, the 3D space creator 15 determines that a 3D scene that looks like viewing at the viewpoint 22*b* is required. It happens when the user tilts the apparatus 1 to the right, which may be detected by a G-sensor or the like (not shown) of the apparatus 1. Under this circumstance, the 3D space creator 15 may render the 3D scene 19*c* by mapping the image 10*b* onto the 3D mesh 18. Alternatively, the 3D space creator 15 may also render the 3D scene 19*c* by mapping the images 10*b*, 10*c* onto the 3D mesh 18 according to a ratio in every different apparatus level.

Briefly speaking, when a G-sensor (or the like) of the apparatus 1 detects that the apparatus 1 is tilted to a direction, the 3D space creator 15 will select suitable image(s) according to the direction and then render the 3D scene by mapping the selected suitable image(s) on to the 3D mesh 18. Since the 3D scene is rendered according to the same 3D mesh 18 and the selected suitable image(s), they are more vividly and without unpleasant artificial effects.

In the above two embodiments, two resolutions are provided. That is, the grids on the plane 18*a* are of two different sizes and the triangles of the 3D mesh 18 are of two different sizes. Nevertheless, the present invention can provide more than two resolutions. For example, the detail finder 113 may categorize the gradient values of the gradient map into three levels. In such case, the level with the lower gradient values will have the lowest resolution, the level with the higher gradient values will have the finest resolution, and the level in between will have the middle resolution. The mesh generator 13 then generate the 3D mesh 18 based on these levels. For the lowest resolution, the corresponding grids will not be sub-divided. For the middle and the finest resolutions, the corresponding grids will be sub-divided to different degrees. The rest operations are the same, so the details are not repeated.

Figure 3:
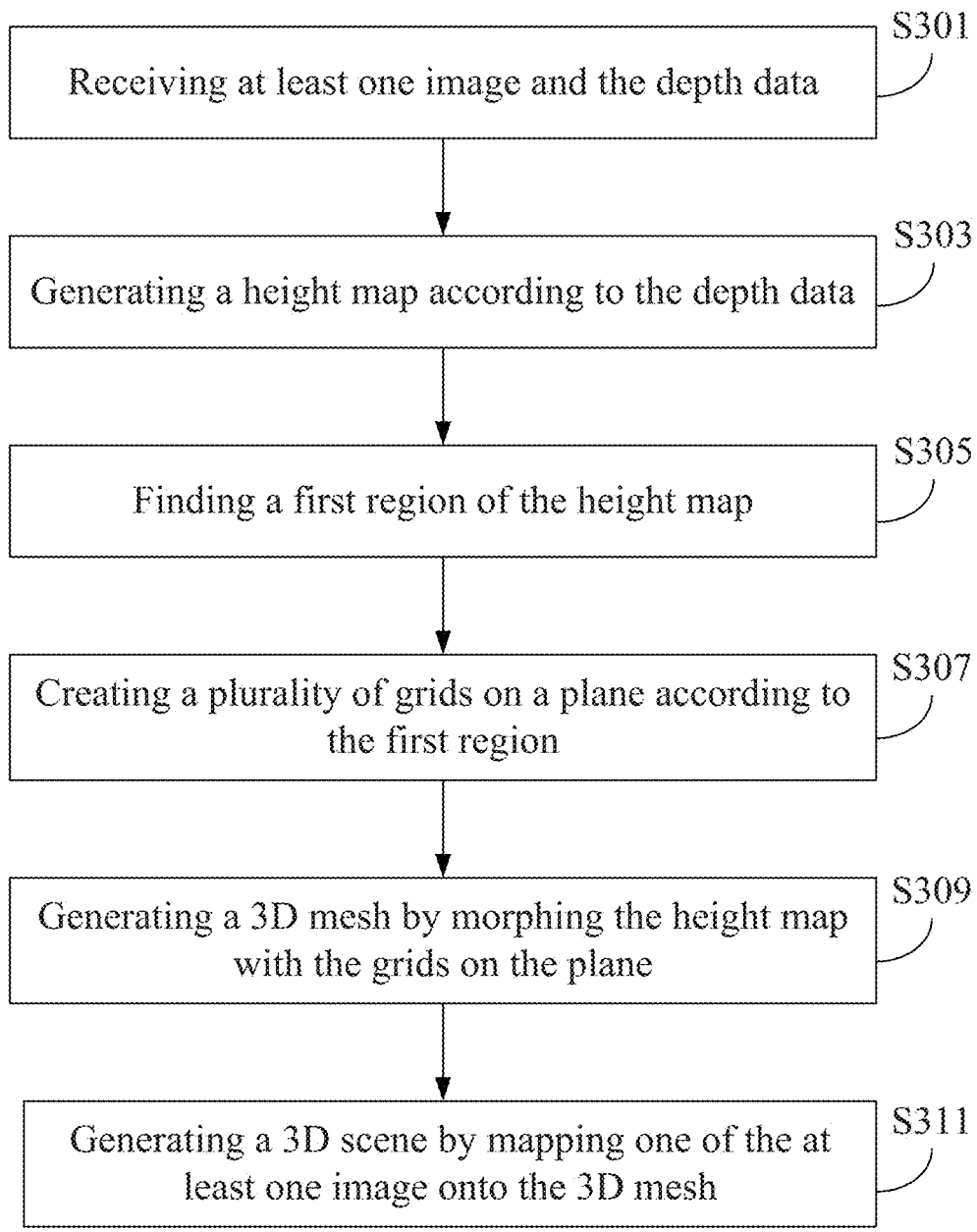
FIG. 3 illustrates the flowchart of the method in the third embodiment of the present invention.

Please refer to FIG. 3 for the flowchart of a method for creating a 3D scene in a third embodiment of the present invention. The method may be executed by an electronic apparatus, such as the apparatus 1 in the first and the second embodiments.

First, the method executes step S301 for receiving at least one image and the depth data, wherein the depth data corresponding the at least one image. The content of the depth data and the relation between the depth data and the at least one image are addressed in the first and second embodiment; hence, they are not repeated herein. It is noted that if the at least one image and the depth data are already stored in the electronic apparatus, the step S301 may be omitted.

Next, the method executes step S303 for generating a height map according to the depth data, wherein the height map and the first image have the same aspect ratio. It is noted that each of the at least one image contains a scene of a real world from a viewpoint and each of the depth data comprises a distance value related to a distance between the viewpoint and a point of a surface of the scene. Therefore, in some embodiment, the step S303 may be achieved by a step of inserting the distance values into the height map (not shown). In some other embodiments, the step S303 may be achieved by a step of inserting the distance values into the height map (not shown) and a step of performing at least one of a de-noise operation and a smooth operation on the distance values contained in the height map (not shown).

Following that, the method executes step S305 for finding a first region of the height map, wherein the depth data within the first region change more greatly than the depth data outside the first region. In some embodiments, the step S305 may be achieved by a step of generating a gradient map of the height map (not shown) and a step of deciding a region of the height map that contains greater gradient values as the first region (not shown). Yet in some other embodiments, the step S305 may be achieved by a step of generating a gradient map of the height map (not shown) and a step of deciding a region within a region of interest of the height map that contains greater gradient values as the first region (not shown).

Afterwards, the method executes step S307 and step S309 for generating a 3D mesh according to the first region and the height map. To be more specific, the step S307 creates a plurality of grids on a plane according to the first region, wherein a size of the plane is equivalent to a size of the height map, a second region within the plane corresponds to the first region of the height map, and the grids inside the second region has a finer resolution than the grids outside the second region. The step 309 generates a 3D mesh by morphing the height map with the grids of the plane.

Finally, the method executes step S311 for generating a 3D scene by mapping one of the at least one image onto the 3D mesh. If more than one image is received in the step S301 and each of the images is captured from different viewpoints, the 3D scene can be generated/rendered more vividly by mapping suitable image(s) onto the 3D mesh. For example, in some embodiments, the method may further executes a step for detecting that the electronic apparatus is tilted to a direction (not shown), a step for selecting suitable image(s) according to the direction (not shown), and a step for rendering the 3D scene by mapping the selected suitable image(s) onto the 3D mesh. The selected suitable images will determine the color of every pixel in the 3D mesh based on the viewpoint (or tilting direction) every update.

In addition to the aforesaid steps, the third embodiment can execute all the operations and have the functions set forth in the first and second embodiments. How the third embodiment executes these operations and have the functions will be readily appreciated by those of ordinary skill in the art based on the explanation of the first and second embodiments, and thus will not be further described therein.

The method for creating a 3D scene of the third embodiment may be implemented by a computer program which is stored in a non-transitory tangible machine-readable medium. When the computer program is loaded into an electronic apparatus, a plurality of codes comprised in the computer program will be executed by the electronic apparatus to accomplish all the steps described in the third embodiment. This non-transitory tangible machine-readable medium may be a read only memory (ROM), a flash memory, a floppy disk, a hard disk, a compact disk (CD), a mobile disk, a database accessible to networks, or any other storage media with the same function and well known to those skilled in the art.

According to the above descriptions, the present invention can create a 3D scene in an efficient approach because only at least one image and its corresponding depth data are referred to during the procedure of creating the 3D scene. In the meantime, a 3D scene created by the present invention is a pleasant one because the detail portion(s) of the at least one image is treated differently by mapping onto a finer portion of the 3D mesh. Moreover, if there is more than one image and the images are captured from different viewpoints, the 3D scene can be generated more vividly by selecting suitable image(s) according to the desired viewpoint and rendering the 3D scene by mapping the selected suitable images onto the 3D mesh. Hence, the 3D scene will have no unpleasant artificial effects.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for creating a three-dimensional (3D) scene, comprising:
    an interface, being configured to receive a first image and a plurality of depth data of the first image; and
    a processing unit, being electrically connected to the interface and configured to generate a height map according to the depth data, wherein the height map and the first image have the same aspect ratio,
    wherein the processing unit is further configured to find a first region of the height map, the depth data within the first region change more greatly than the depth data outside the first region,
    wherein the processing unit is further configured to create a plurality of grids on a plane according to the first region and generate a 3D mesh by morphing the height map with the grids of the plane, a size of the plane is equivalent to a size of the height map, a second region within the plane corresponds to the first region of the height map, and the grids inside the second region has a finer resolution than the grids outside the second region,
    wherein the processing unit is further configured to generate the 3D scene by mapping the first image onto the 3D mesh.

2. The apparatus of claim 1, wherein the first image contains a scene of a real world from a viewpoint, each of the depth data comprises a distance value related to a distance between the viewpoint and a point of a surface of the scene in the real word, and the processing unit generates the height map by inserting the distance values into the height map and performing at least one of a de-noise operation and a smooth operation on the distance values contained in the height map.

3. The apparatus of claim 1, wherein the processing unit finds the first region by generating a gradient map of the height map and deciding a region of the height map that contains greater gradient values as the first region.

4. The apparatus of claim 1, wherein the processing unit finds the first region by generating a gradient map of the height map and deciding a region within a region of interest of the height map that contains greater gradient values as the first region.

5. The apparatus of claim 1, wherein the first image contains a scene of a real world from a first viewpoint, a second image contains the scene from a second viewpoint, and the processing unit renders the 3D scene by mapping the second image onto the 3D mesh.

6. The apparatus of claim 5, further comprising:
    a G-sensor, being configured to detect that the apparatus is tilted to a direction;
    wherein the 3D scene is rendered by the 3D space creator according to the detection of the G-sensor.

7. The apparatus of claim 1, wherein the first image contains a scene of a real world from a first viewpoint, a second image contains the scene from a second viewpoint, and the 3D space creator renders the 3D scene by mapping both the first image and the second image onto the 3D mesh.

8. The apparatus of claim 7, further comprising:
    a G-sensor, being configured to detect that the apparatus is tilted to a direction;
    wherein the 3D scene is rendered by the 3D space creator according to the detection of the G-sensor.

9. A method for creating a 3D scene, being executed by an electronic apparatus and comprising the following steps of:
    generating a height map according to a plurality of depth data of a first image, wherein the height map and the first image have the same aspect ratio;
    finding a first region of the height map, wherein the depth data within the first region change more greatly than the depth data outside the first region;
    creating a plurality of grids on a plane according to the first region, wherein a size of the plane is equivalent to a size of the height map, a second region within the plane corresponds to the first region of the height map, and the grids inside the second region has a finer resolution than the grids outside the second region;

generating a 3D mesh by morphing the height map with the grids of the plane; and generating the 3D scene by mapping the first image onto the 3D mesh.

10. The method of claim 9, wherein the first image contains a scene of a real world from a viewpoint, each of the depth data comprises a distance value related to a distance between the viewpoint and a point of a surface of the scene in the real word, and the step of generating the height map comprises the steps of:

inserting the distance values into the height map; and performing at least one of a de-noise operation and a smooth operation on the distance values contained in the height map.

11. The method of claim 9, wherein the step of finding the first region comprises the steps of:

generating a gradient map of the height map; and deciding a region of the height map that contains greater gradient values as the first region.

12. The method of claim 9, wherein the step of finding the first region comprises the steps of:

generating a gradient map of the height map; and deciding a region within a region of interest of the height map that contains greater gradient values as the first region.

13. The method of claim 9, wherein the first image contains a scene of a real world from a first viewpoint, a second image contains the scene from a second viewpoint, and the method further comprises the step of:

rendering the 3D scene by mapping the second image onto the 3D mesh.

14. The method of claim 13, further comprising the step of:

detecting that the electronic apparatus is tilted to a direction;

wherein the 3D scene is rendered according to the detection that the electronic apparatus is tilted to the direction.

15. The method of claim 9, wherein the first image contains a scene of a real world from a first viewpoint, a second image contains the scene from a second viewpoint, and the method further comprises the step of:

rendering the 3D scene by mapping both the first image and the second image onto the 3D mesh.

16. The method of claim 15, further comprising the step of:

detecting that the electronic apparatus is tilted to a direction;

wherein the 3D scene is rendered according to the detection that the electronic apparatus is tilted to the direction.

17. A non-transitory tangible computer readable medium, being stored with a computer program, the computer program executing a method for creating a 3D scene after being loaded into an electronic apparatus, and the method comprising the following steps of:

generating a height map according to a plurality of depth data of a first image, wherein the height map and the first image have the same aspect ratio;

finding a first region of the height map, wherein the depth data within the first region change more greatly than the depth data outside the first region;

creating a plurality of grids on a plane according to the first region, wherein a size of the plane is equivalent to a size of the height map, a second region within the plane corresponds to the first region of the height map, and the grids inside the second region has a finer resolution than the grids outside the second region;

generating a 3D mesh by morphing the height map with the grids of the plane; and generating the 3D scene by mapping the first image onto the 3D mesh.

* * * * *